(12) United States Patent
Naqvi

(10) Patent No.: US 9,432,254 B1
(45) Date of Patent: Aug. 30, 2016

(54) CLONING VIRTUAL NETWORK RESOURCES AND TEMPLATES

(71) Applicant: CA, Inc., Islandia, NY (US)

(72) Inventor: Shozab H. Naqvi, Dix Hills, NY (US)

(73) Assignee: CA, Inc., Islandia, NY (US)

( * ) Notice: Subject to any disclaimer, the term of this patent is extended or adjusted under 35 U.S.C. 154(b) by 509 days.

(21) Appl. No.: 13/794,908

(22) Filed: Mar. 12, 2013

(51) Int. Cl.
*G06F 15/173* (2006.01)
*H04L 12/24* (2006.01)

(52) U.S. Cl.
CPC ........... *H04L 41/08* (2013.01); *H04L 12/2409* (2013.01)

(58) Field of Classification Search
CPC ... H04L 12/28; H04L 41/0893; H04L 49/25; H04L 49/65; H04L 49/70; H04L 41/08; G06F 9/5077; G06F 9/45558
USPC ........................................................ 709/223
See application file for complete search history.

(56) References Cited

U.S. PATENT DOCUMENTS

| | | | |
|---|---|---|---|
| 8,599,854 B2* | 12/2013 | Srinivasan | H04L 41/0893 370/392 |
| 8,867,552 B2* | 10/2014 | Vobbilisetty et al. | ... 370/395.53 |
| 2005/0108375 A1* | 5/2005 | Hallak-Stamler | ............. 709/223 |
| 2005/0232256 A1* | 10/2005 | White et al. | ................... 370/360 |
| 2011/0283278 A1* | 11/2011 | Murrell | ................. G06F 9/5077 718/1 |
| 2011/0317708 A1* | 12/2011 | Clark | .................. H04L 12/4641 370/395.1 |
| 2012/0278802 A1* | 11/2012 | Nilakantan et al. | .............. 718/1 |
| 2014/0133358 A1* | 5/2014 | Yin | ..................... H04L 41/0893 370/254 |
| 2014/0365623 A1* | 12/2014 | Golasky | ............. H04L 67/1097 709/221 |

* cited by examiner

*Primary Examiner* — Tauqir Hussain
(74) *Attorney, Agent, or Firm* — Stevens & Showalter LLP

(57) ABSTRACT

Replicating a virtual resource includes identifying source virtual switch structure to be replicated comprising a set of configuration parameters and creating target virtual switch structure by replicating the source virtual switch structure and a first subset of the set of configuration parameters.

33 Claims, 10 Drawing Sheets

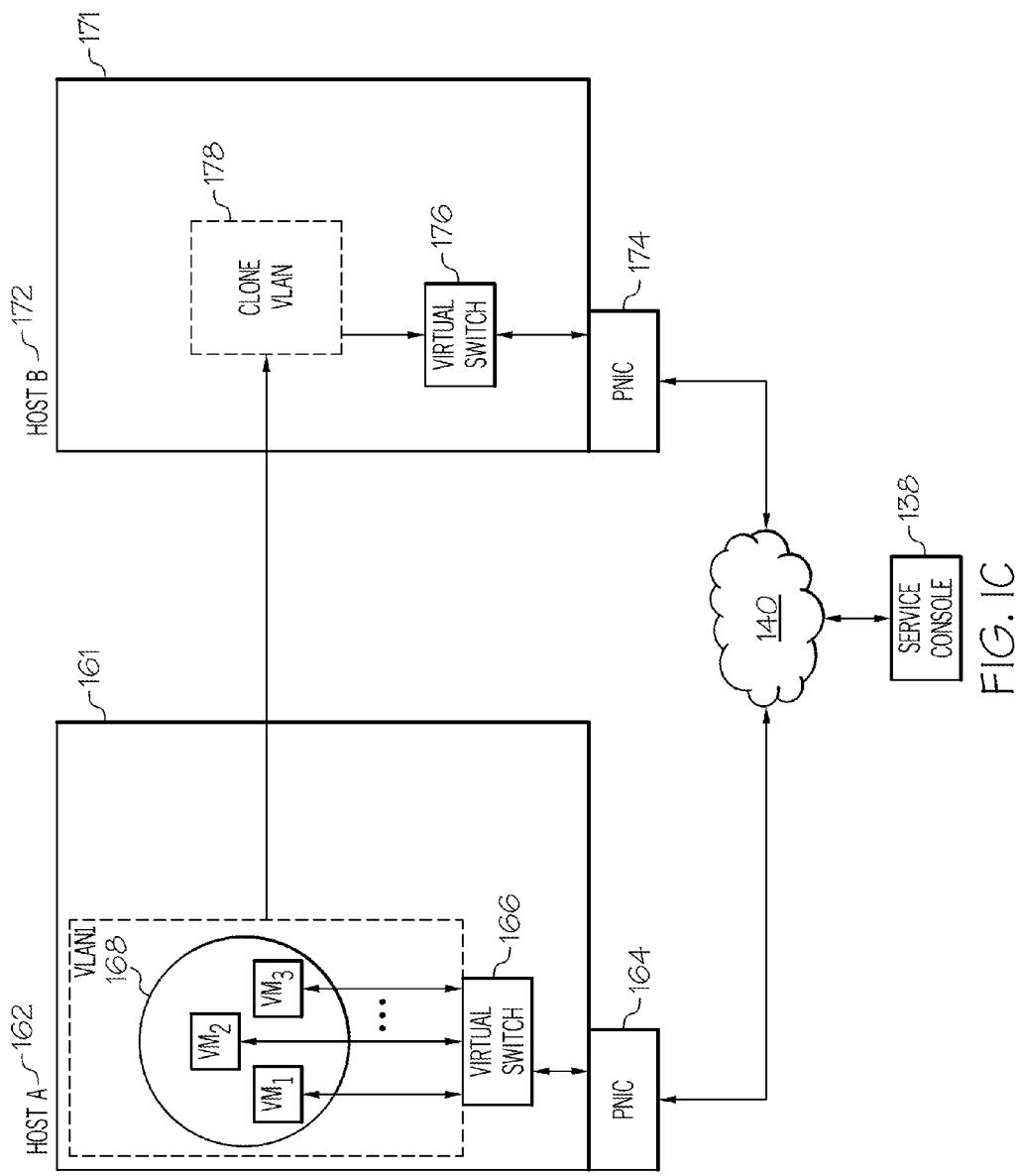

CLONING VIRTUAL NETWORK RESOURCES AND TEMPLATES

BACKGROUND

The present disclosure relates to user virtualized network resources, and more specifically, to cloning those resources.

Virtualized network environments include a physical host having a physical network adapter on which one or more virtual machines are hosted. Each virtual machine typically has a virtual network adapter so that virtualized network communication can occur between the virtual machines. Just as physical networks can include physical switches, these virtualized networks can include virtual switches. Configuration of the virtual switches mimics that of configuring physical switches. In particular each port of the virtual switch can be assigned configuration options related to security, virtual local area network (VLAN) identifiers, traffic shaping (or limiting) parameters, and the like. One port of a virtual switch can be designated as an uplink port so that network traffic from a physical network adapter can arrive at the virtual switch and some network traffic from the virtual switch can be directed to the physical network adapter.

Each of the physical hosts can be connected together via their physical network adapters so that the virtualized networks on each physical host can communicate with one another. In this way, virtual machines on different physical hosts can communicate with one another as if they were physical machines on an appropriately structured physical network.

A user can use a management console or a service console to build and configure virtualized network environments as described above. The service console can provide an interface to management software that can communicate with each of the physical hosts. Using this management software, the user designates which virtual network resources are located on which physical hosts, how the virtual network resources are connected together, and how each virtual network resource is configured.

BRIEF SUMMARY

According to one aspect of the present disclosure, a method of replicating a virtual resource that includes identifying, by a computer, source virtual switch structure to be replicated comprising a set of configuration parameters; and creating, by the computer, target virtual switch structure by replicating the source virtual switch structure and a first subset of the set of configuration parameters.

According to another aspect of the present disclosure, a computer program product for replicating a virtual resource that includes a computer readable storage medium having computer readable program code embodied therewith. The computer readable program code includes computer readable program code configured to identify source virtual switch structure to be replicated comprising a set of configuration parameters; and computer readable program code configured t to create target virtual switch structure by replicating the source virtual switch structure and a first subset of the set of configuration parameters.

According to another aspect of the present disclosure, a system for replicating a virtual resource that includes a processor and a memory coupled to the processor, the memory configured to store program code executable by the processor. The program code is configured, when executed by the processor, to identify source virtual switch structure to be replicated comprising a set of configuration parameters and to create target virtual switch structure by replicating the source virtual switch structure and a first subset of the set of configuration parameters.

BRIEF DESCRIPTION OF THE DRAWINGS

Aspects of the present disclosure are illustrated by way of example and are not limited by the accompanying figures with like references indicating like elements.

FIG. 1C illustrates an example computing environment in which a virtual resource may be cloned in accordance with the principles of the present disclosure.

DETAILED DESCRIPTION

Figure 1A:
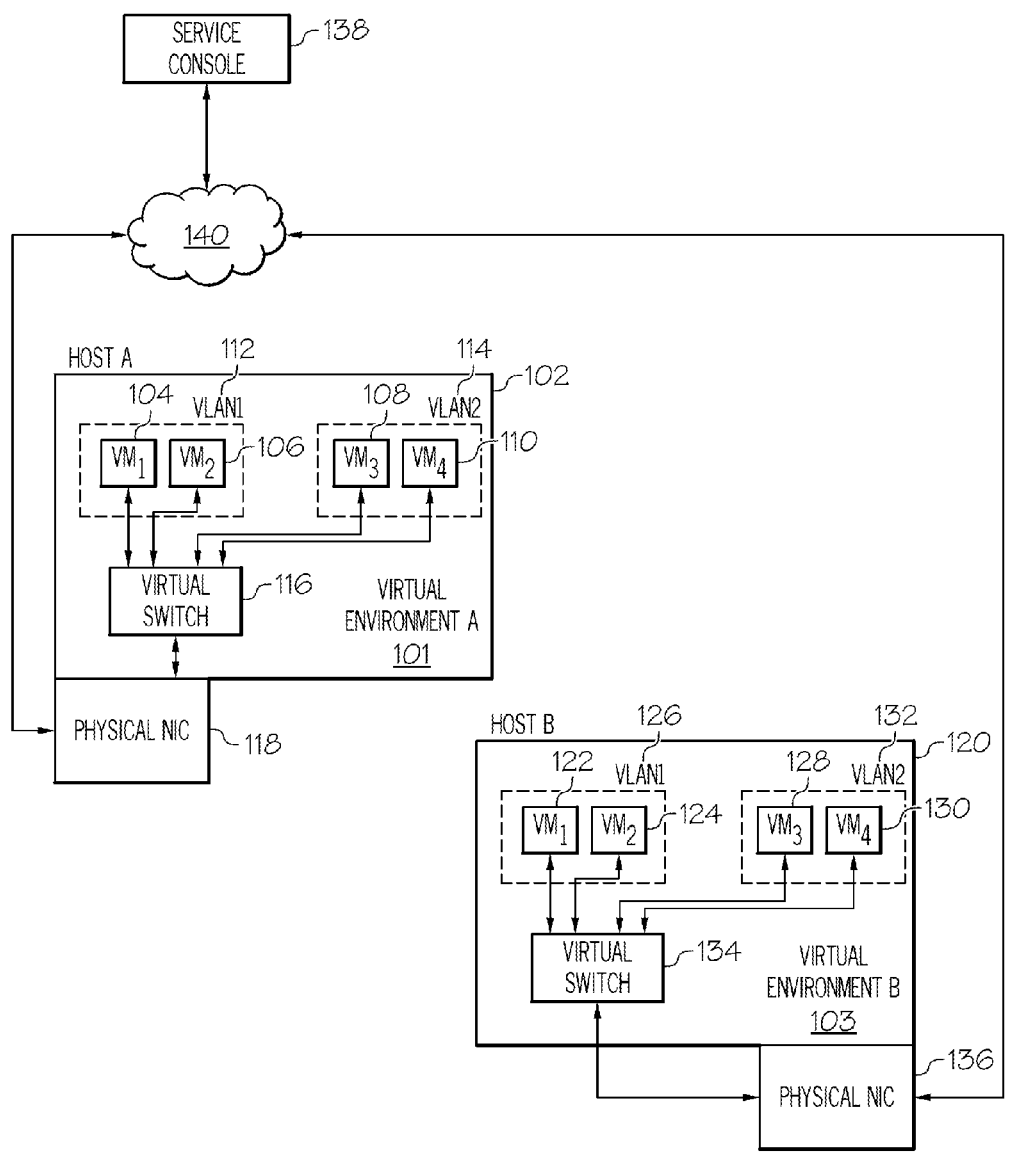
FIG. 1A illustrates an example computing environment that includes virtual resources in accordance with the principles of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As described herein a virtualized network environment may include various virtual resources that mimic physical network resources and computers. In particular, a standard virtual switch and a distributed virtual switch are used in different examples that help explain portions of the present disclosure. As described in more detail below, some of the differences between a distributed virtual switch and a standard, or individual, virtual switch relate to how a user can manage and configure these virtual resources. As used herein, the term "virtual switch" can refer to both types of virtual resources—either a distributed virtual switch or a standard virtual switch. Furthermore, some examples are described in which activity of a user is described as "selecting ports" or "identifying ports" of a virtual switch as a target location for a cloned virtual resource. This phrase may be used to describe when the user does, in fact, select specific ports, or port numbers of a virtual switch; however, the phrase also encompasses user activity in which the user merely identifies a target virtual switch and a management application automatically assigns port designations from amongst available ports of that virtual switch.

FIG. 1A illustrates an example virtualized networking environment in accordance with the principles of the present disclosure. There are two physical hosts in FIG. 1A, Host A 102 and Host B 120. Each of these physical hosts 102, 120 includes a respective physical network adapter (or network interface card (NIC)) 118, 136. The physical NICs 118, 136 allow network communications to be shared between the two physical hosts 102, 120 via a network 140. Also shown in FIG. 1A is a service console 138 that uses the network 140 to communicate with the physical hosts 102, 120 as well. In some instances, the service console 138 may be executing on one of the physical hosts 102, 120 but in FIG. 1A, it is shown as a separate entity to highlight its separate functionality.

Using virtualization software that is executing on Host A 102 and the functionality of the service console 138, a Virtual Environment A 101 can be created to mimic a physical network arrangement of a number of physical machines. However, the resources within the Virtual Environment A 101 are virtual resources rather than physical resources. These virtual resources can include a virtual switch 116 to which four virtual machines $VM_1$ 104, $VM_2$ 106, $VM_3$ 108, $VM_4$ 110 are connected. The virtual switch 116 includes a number of ports (e.g., 24) with one port being an uplink port that is connected to the physical NIC 118 of the physical host Host A 102. Similar to a physical switch and physical machines, each virtual machine 104, 106, 108, 110 has a virtual network adapter that is connected to one of the ports of the virtual switch 116. Additionally, the virtual switch 116 can be configured using the management console 138 to logically group ports into virtual local area networks (VLANs) so that network traffic within the virtual switch 116 can be limited to appropriate VLANs as desired. One of ordinary skill will recognize that VLAN functionality can be omitted without departing from the scope of the present disclosure. In FIG. 1A, two example VLANs happen to be illustrated—$VLAN_1$ 112 includes $VM_1$ 104 and $VM_2$ 106 while $VLAN_2$ 114 includes $VM_3$ 108 and $VM_4$ 110.

The physical host Host B 120 can also provide a Virtual Environment B 103 similar to that provided by Host A 102. In particular, the Virtual Environment B 103 can include its own virtual switch 134 that is connected to the physical NIC 136 and four virtual machines $VM_1$ 122, $VM_2$ 124, $VM_3$ 128, VM$_4$ 130. These four virtual machines 122, 124, 128, 130 can be logically grouped into two VLANs 126, 132 as shown in FIG. 1A. A user that uses the service console 138 to configure Virtual Environment A 101 and Virtual Environment B 103 may create the two virtual switches 116 and 134 on their respective physical hosts Host A 102 and Host B 120. Because the virtual switches are separately configured each virtual switch has its own respective versions of the virtual machines VM$_1$-VM$_4$ and virtual LANs VLAN$_1$-VLAN$_2$.

In FIG. 1A, each physical host 102, 120 is shown as having a single, respective virtual switch 116, 134; however, one of ordinary skill will recognize that additional virtual switches can be included in order to construct more complex virtualized network environments. Also, each virtual machine is shown as having only one connection to a port of a virtual switch. One of ordinary skill will also recognize that virtual machines can be configured to have multiple virtual network adapters and, therefore, may connect to multiple ports of a virtual switch as well. Similarly, more than two physical hosts may be networked together to provide even more resources for the virtualized network environment of FIG. 1A.

Figure 1B:
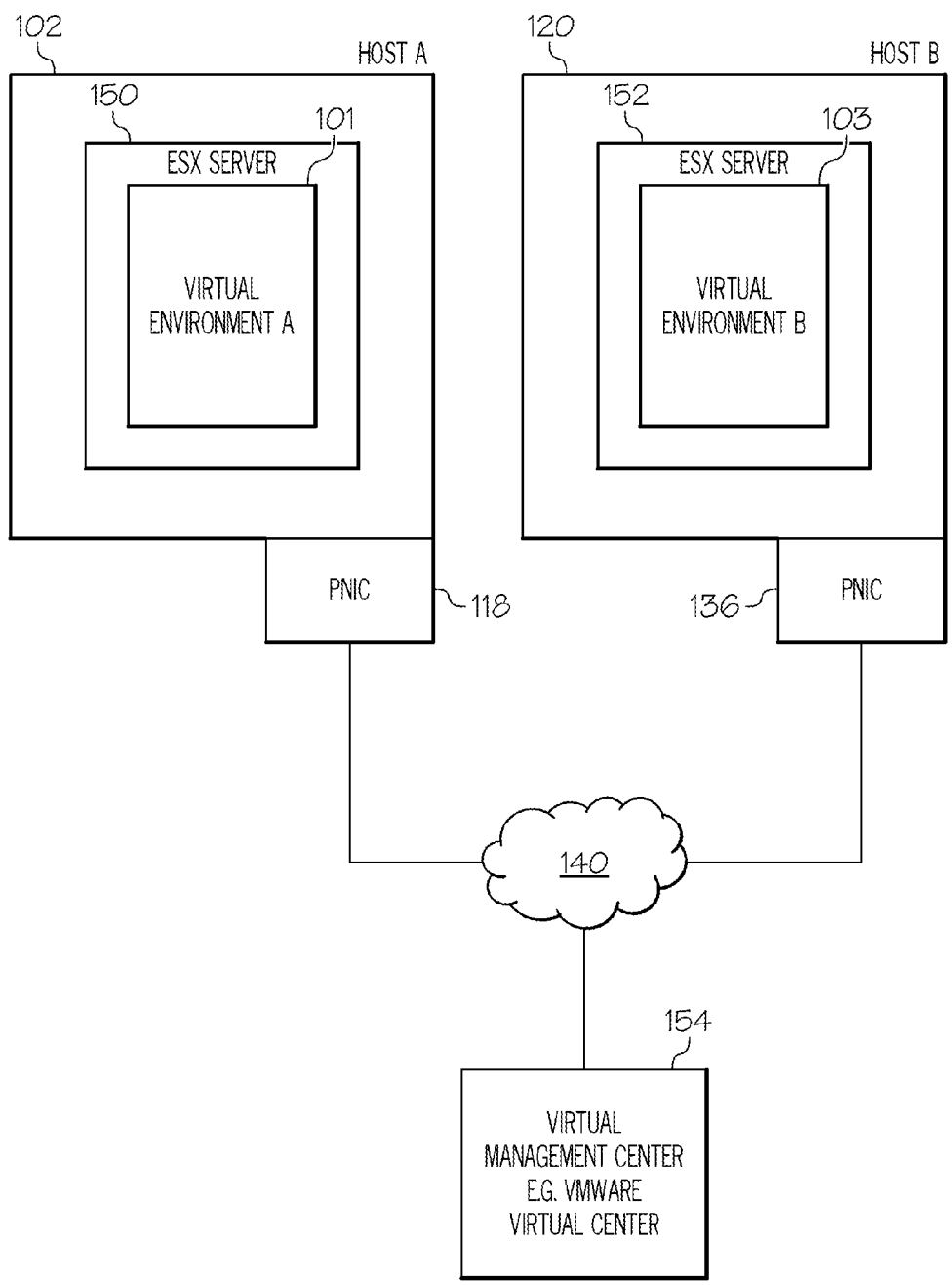
FIG. 1B illustrates another example computing environment that includes virtual resources in accordance with the principles of the present disclosure.

FIG. 1B is a more abstract view of the virtualized network environment of FIG. 1A. Each physical host 102, 120 may include a respective application 150, 152 that provides a respective virtual environment 101, 103 for that physical host. An example of such an application is VMWare ESX Server 150, 152. The separate applications 150, 152 are managed and configured using a management application referred to generically in FIG. 1B as a virtual management center 154 or as a service console 138 in FIG. 1A. An example of such an application is VMWare VirtualCenter. Each application 150, 152 stores the information, settings, connections, and policies for their respective virtual environments 101, 103 that allow network packets to pass between virtual machines in each virtual environment 101, 103. These information, settings, connections, and policies also allow network packets to be received and transmitted through the pNICs 118, 136 so that the two virtual environments 101, 103 can be connected to form a virtualized network environment spanning across at least two different physical hosts. Thus, herein, when user activity is described as configuring a virtual computer resource, it is meant that the user is configuring one of the applications 150, 152 that are providing the virtual environments 101, 103. The virtual management center provides tools that allow a user to select a type of virtual resource (e.g., VLAN, a switch port, a distributed port group, etc.) and add it within one of the virtual environments 101, 103. Once the virtual resource is added, the user can then perform configuration of the added virtual resource to set all of its applicable settings and properties. In accordance with the principles of the present disclosure, similar tools are provided to the user to clone existing virtual resources such that target virtual resources can be added to a virtual environment in such a way that their respective configuration parameters are all pre-set based on the configuration parameters of the existing virtual resources. An alternative example is also described in which a user is given an opportunity to modify some configuration parameters before cloning of a resource is completed.

In FIG. 1C, one physical host Host A 162 provides a first virtual environment 161 in which there is a VLAN (e.g., VLAN$_1$ 168) associated with a standard, or individual, virtual switch 166. Host A 162 also includes a physical NIC (pNIC) 164. Another physical host Host B 172 provides a second virtual environment 171. Assuming that a virtual switch 176 has already been provisioned within the second virtual environment 171, a virtual resource from the first virtual environment 161 may be replicated into the second virtual environment 171.

The virtual resource in the first virtual environment 161 that is to be replicated may, for example, be the VLAN$_1$ 168. This virtual resource can be considered part of a source virtual switch structure in that the VLAN$_1$ 168 includes information about how at least some of the ports of the virtual switch 166 are configured (e.g., private VLAN settings). The VLAN$_1$ 168 may also include other configuration information such as information about the virtual machines VM$_1$, VM$_2$, and VM$_3$. A user may use the service console 138 to select all the configuration information about the VLAN$_1$ 168 and to select a number of ports on the virtual switch 176 where VLAN$_1$ 168 is to be cloned as another VLAN 178. The cloned VLAN 178 can be considered part of a target virtual switch structure in that it includes information about how at least some of the ports on the virtual switch 176 are configured. In addition to cloning the target virtual source structure related to the VLAN 178, the individual virtual machines can be replicated as well within the virtual environment 171.

One of ordinary skill will recognize that the source (and target) virtual switch structure can include standard port groups, distributed port groups, wherein the distributed port groups may be cloned alone or in combination with the distributed virtual switch, VLANs, a virtual switch (i.e., a standard virtual switch or a distributed virtual switch) itself, and network connectivity information about VMs that are coupled with a virtual switch. Thus, FIG. 1C provides only one example of cloning of source virtual switch structure and, as described below, there are other examples of cloning source virtual switch structure in accordance with the principles of the present invention.

Figure 2A:
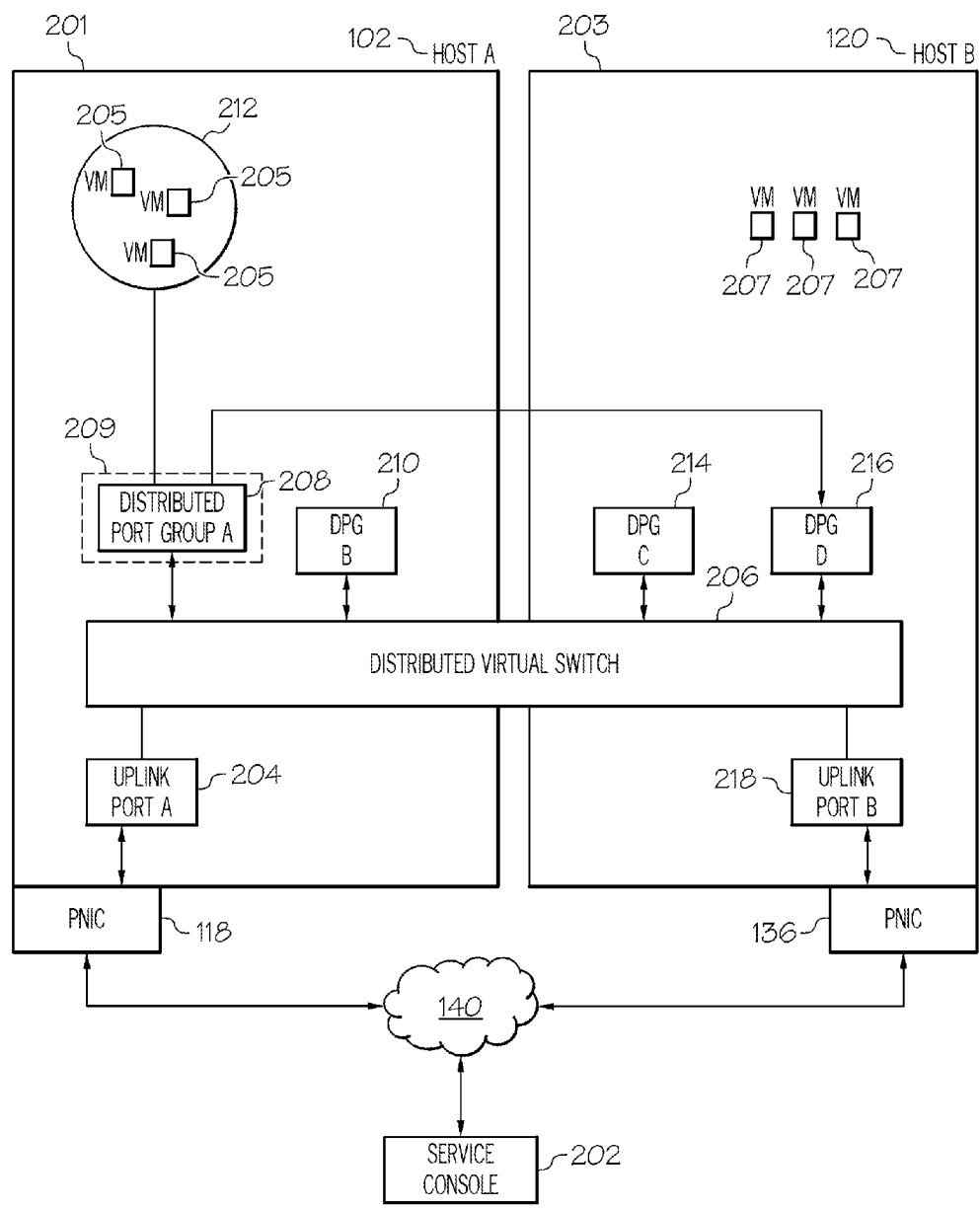
FIGS. 2A-2E depict example computing environments, based on the environment of FIG. 1B, in which virtual resources can be cloned in accordance with the principles of the present disclosure.

FIG. 2A illustrates a similar virtualized network environment to that of FIG. 1A and FIG. 1C but includes a distributed virtual switch 206, which functions as the equivalent of two or more individual switches. A distributed virtual switch 206 provides a different management and configuration method than the standard or individual virtual switches 116, 134 of FIG. 1A. With the distributed virtual switch 206, the functionality of individual virtual switches is accomplished by combining all the individual switches into a single distributed virtual switch. Rather than a user needing to use the service console 202 to configure an individual virtual switch on each physical host, the virtualized network environment is treated as an aggregated resource and the individual host-level virtual switches are abstracted into a single managed resource referred to as a distributed virtual switch (DVS). Each of the applications 150, 152 that provide the virtual environments 101, 103 are responsible for maintaining configuration information about the DVS that pertains to their respective virtual environment. In this way, for the DVS 206, a separate, respective switch data plane may exist for each virtual environment 101, 103 but only a single management plane exists for virtual networked environment of FIG. 2A.

Thus, in FIG. 1A if each virtual switch 116, 134 has one uplink port and 23 other ports, then a comparable DVS 206 in FIG. 2A would have 48 ports with two of them being uplink ports. A user using the service console 202 would configure the 48 ports in a way that replicates the connectivity represented by the two individual virtual switches 116, 134.

One logical construct that may be utilized with the DVS 206 is that of a distributed port group. Each port of an individual virtual switch and each port of a DVS can be configured to have certain settings and policies, when related to a DVS 206, such a port group can be referred to as a distributed port group. These settings and policies can relate to Layer-2 security options, bi-directional traffic limiting, VLAN identifiers, uplink connectivity, and load balancing. A distributed port group is a logical collection of a subset of the ports available in a DVS in which the settings and policies for the subset of ports, and the virtual machines coupled with these ports, are all the same. As shown in FIG. 2A, a DVS 206 can be configured to have multiple distributed port groups (DPGs) such as DPG A 208, DPG B 210 and DPG C 214.

Similar to a physical switch, a virtual switch maintains a forwarding table that looks up a frame's destination MAC address, forwards the frame to one or more ports, and avoids unnecessary deliveries.

Thus, a distributed port group may contain sufficient configuration information to provide internal and/or network access for virtual network adapters of a virtual machine coupled with ports of the distributed virtual switch. A port group definition may, for example, specify a VLAN Identifier associated with that port group, specify egress network bandwidth (e.g., from a VM to a network), ingress network bandwidth (e.g., from a network to a VM). The network bandwidth parameters can relate to average bandwidth, peak bandwidth, or burst size. The port group definition can also include layer-2 related security features such as promiscuous mode capability, locking-down MAC address changes, and preventing forged transmitting.

In operation, a user would use the service console 202 to define a name (or identifier) and the port settings and policies for a new distributed port group. Once that distributed port group is defined, then individual ports of the DVS 206 can be selected as members of the distributed port group. Thus, each port in the distributed port group is configured with the proper settings and policies simply by being identified as a member of that particular distributed port group.

Even though existence of distributed port groups simplifies some of the configuration steps for the DVS 206, additional configuration steps can be simplified in accordance with the principles of the present disclosure. As described in detail with respect to the flowchart of FIG. 3, a user, using the service console 202, may desire to clone, or replicate, an existing distributed port group. In FIG. 2A, for example, DPG A 208 is outlined by the dotted box 209 to indicate that a user has selected this distributed port group to be cloned. The user can then identify target ports of the DVS 206 which are to belong to the new, cloned distributed port group and also a name (e.g., DPG D 216) for the new, cloned distributed port group.

Host A 102 provides a virtual environment 201 and Host B provides its own virtual environment 203 which are coupled through the physical NICs (pNICs) 118, 136 across the network 140 to provide a virtualized network environment. For brevity a VLAN 212 is depicted as a circle encompassing three virtual machines 205. The virtual machines 205 of this VLAN 212 can each be coupled to a port of DPG A 208 of the DVS 206.

There are ports and DPGs of the DVS 206 that are coupled with virtual machines 205 hosted on Host A 102 and then there are other ports and DPGs of the DVS 206 that are coupled with virtual machines 207 that are hosted on Host B 120. Similarly, there is an uplink port A 204 of the DVS 206 that is coupled to the pNIC 118 of Host A 102 and there is an uplink port B 218 that is coupled with the pNIC 136 of Host B 120. Thus, even though the DVS 206 may be managed as a single virtual resource, the other virtual resources coupled with the DVS 206, such as DPGs 208, 210, 214, 216 can be shown in FIG. 2A as being within a particular virtual environment (either 201 or 203).

In FIG. 2A, then, a user may want to clone DPG A 208 such that ports of the DVS which are coupled with the virtual machines 207 on Host B 120 are similarly configured. Using the service console 202, the user can identify a DPG A 208 as a virtual resource to clone. The application (e.g., ESX Server 150 of FIG. 1B) providing the virtual environment 201 recognizes that selection of the DPG A 208 includes a variety of settings and policies pertaining to ports of the DVS 206. When the user selects the target ports to be included in the cloned DPG, these port policies and settings are automatically applied to the selected target ports. In this way a new DPG is created on the DVS 206 and may be given a new identifier (e.g., DPG D 216) by the user. Once the new DPG D 206 is created, the user can attach virtual machines 207 as desired or can change some of the policies or settings of the new DPG D 216. Thus, a new DPG can be easily created without a user explicitly defining all the policies and settings for that new DPG.

Figure 2B:
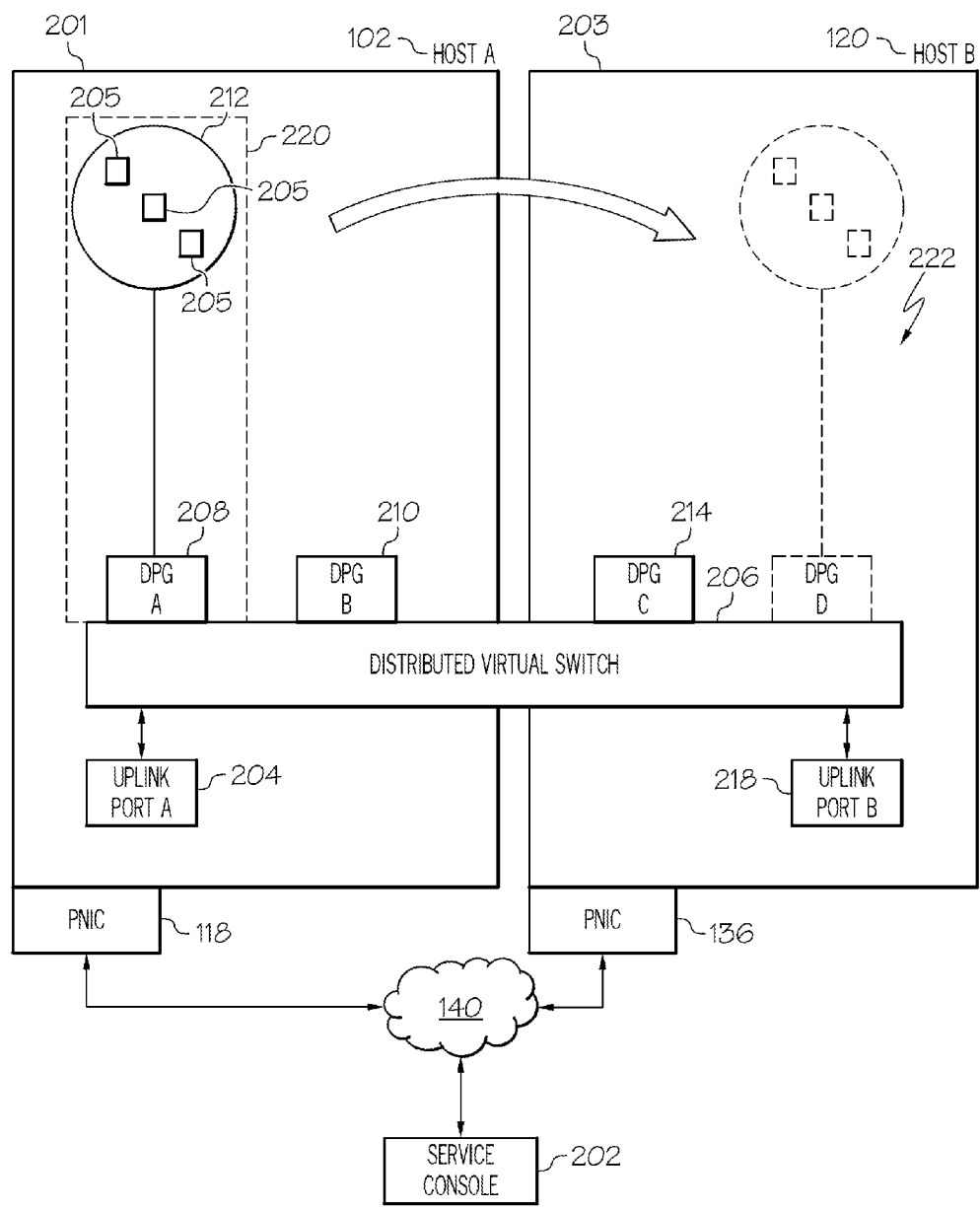

In addition to cloning just a DPG of a DVS 206, all the virtual resources that are coupled to that DPG may be included in the clone as well as shown in FIG. 2B. The application (e.g., ESX Server 150 of FIG. 1B) that is providing the virtual environment 201 on the physical host Host A 102 maintains in its operating memory and storage the policies and setting associated with DPG A 208 as well as the configuration of the VLAN 212 and the configuration of the virtual machines 205.

As shown by the dotted box 220 of FIG. 2B, a user can select the VMs 205, the VLAN 212, and the DPG A 208 as the virtual resources to be cloned. The service console (e.g., VirtualCenter 154 of FIG. 1B) can communicate with the virtual environment 201 (e.g., provided by ESX Server 150) to identify the configuration, settings and policies that are included in all of the virtual resources within the dotted box 220. The service console 202 can then be used to select the ports of the DVS 206 that are the target ports for the cloned virtual resources 220. Once these target ports are identified, the service console 202 can provide the information about the virtual resources 220 to the virtual environment 203 (e.g., provided by ESX Server 152) where they get replicated. In this manner, the virtual resources 220 can be cloned, or replicated, within the virtual environment 203. The service console 202 may select a unique name or identifier for one or more of the cloned virtual resources and then allow the user to change them; or as part of the cloning process, the service console can request that the user provide a unique identifier before replication is complete.

Figure 2C:
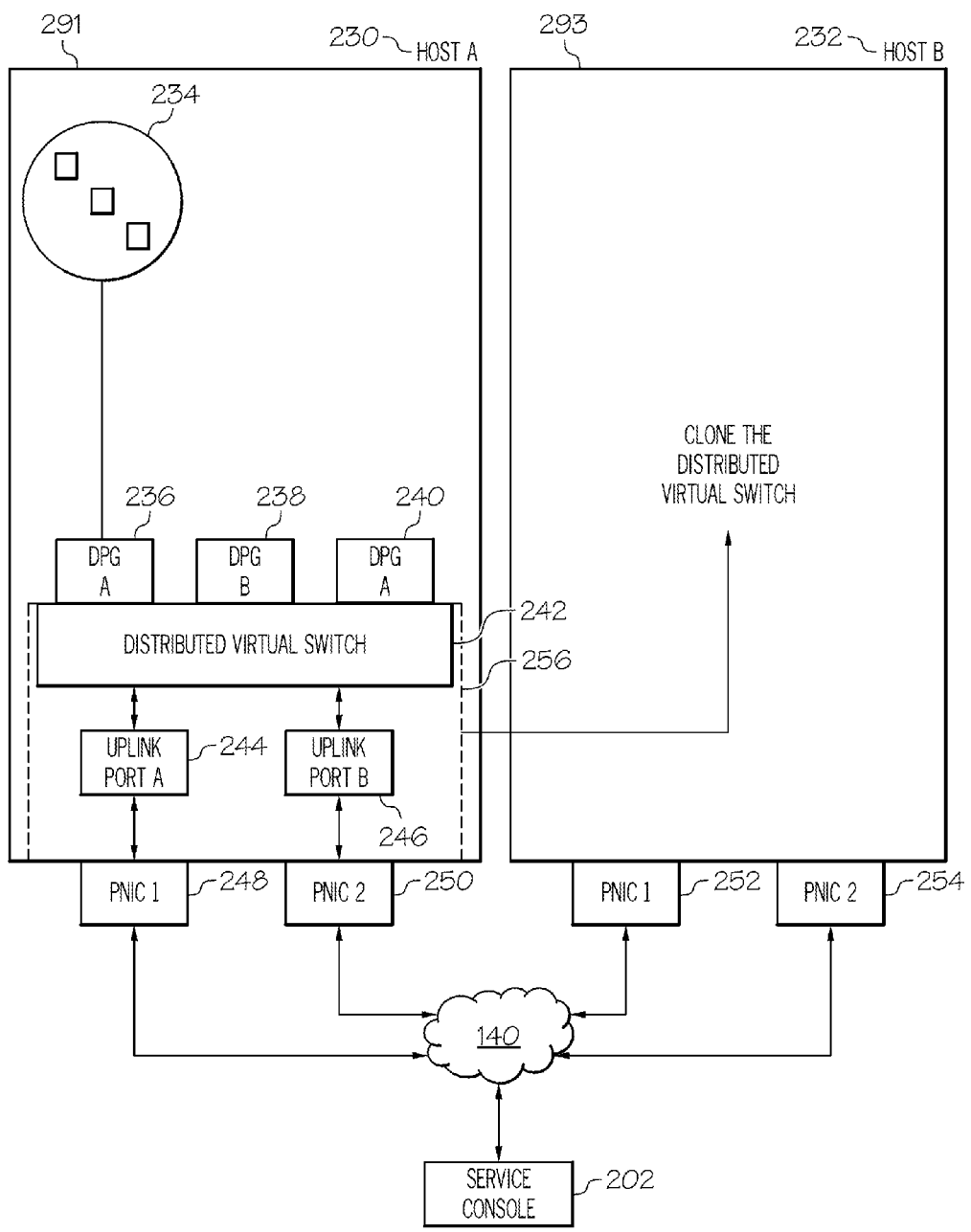

FIG. 2C illustrates a virtualized network environment in which there are two physical hosts—Host A 230 and Host B 232 with only virtual resources currently hosted on Host A 230. Thus, unlike virtual environment 291, the virtual environment 293 of Host B 232 is originally without virtual resources. One of ordinary skill will recognize, however, that in other instances Host B 232 may have its own virtual resources as well. In other ways though, Host A 230 and Host B 232 are similar in that they each have two pNICs, respectively, 248, 250 and 252, 254.

In this instance, a user may use the service console 202 to select the DVS 242 to be cloned. The dotted box 256 encompasses the DVS 242 and information about the two uplink ports 244, 246 being coupled with a respective pNIC. The service console 202 can cause the entire configuration, policies, and setting of the DVS 242 to be replicated within the virtual environment 293 hosted on Host B 232. Although not shown within the dotted box 256, the distributed port groups DPG A 236, DPG 238, DPG C 240 may or may not be included within the virtual resources that are cloned.

Figure 2D:
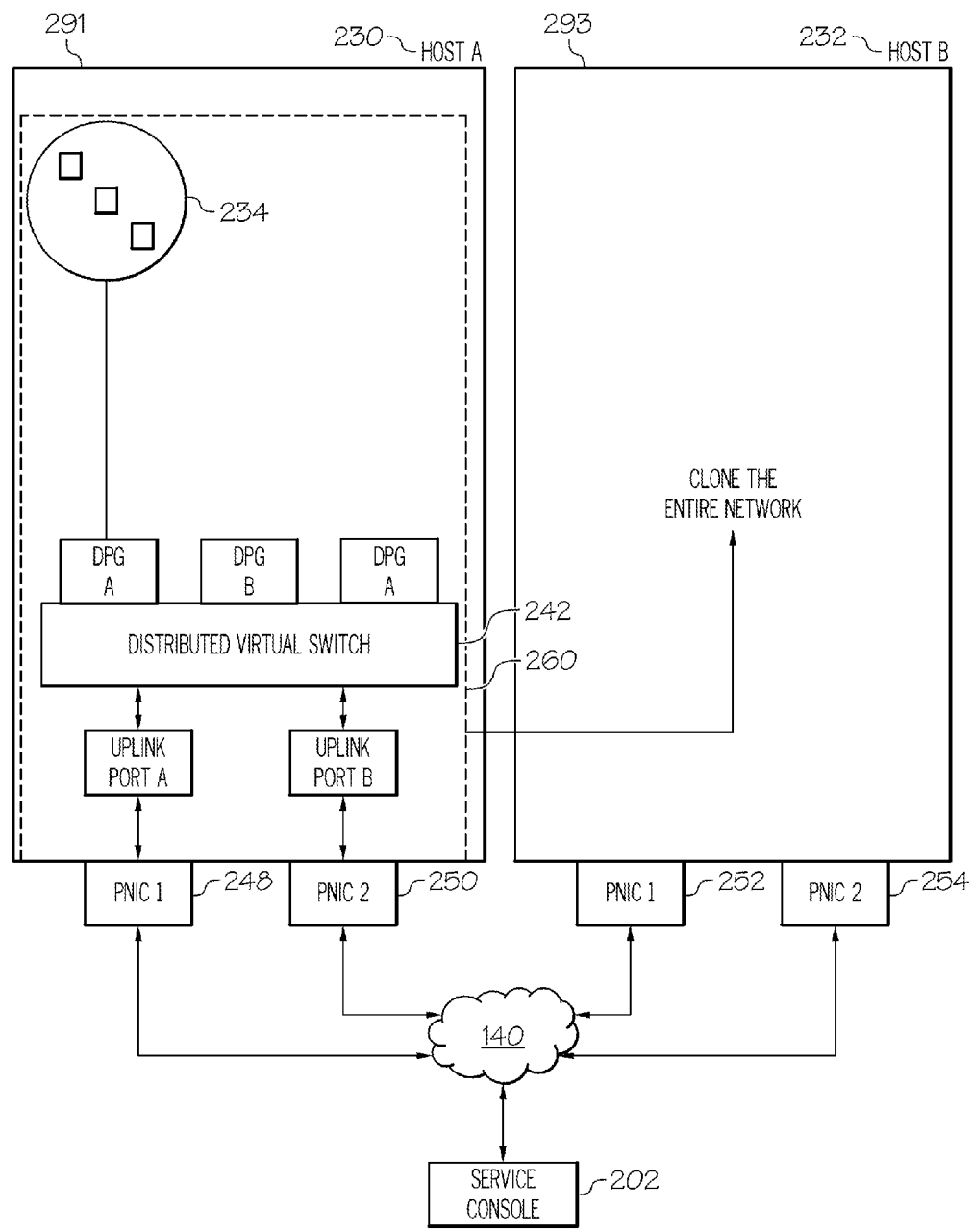

As shown in FIG. 2D, for example, a user can use the service console 202 to select all the virtual resources within the dotted box 260 and clone an entire virtual network from one physical host Host A 230 to another physical host Host B 232.

The examples of FIG. 2A-2D are meant to illustrate a variety of cloning procedures that may be accomplished in accordance with the principles of the present disclosure. However, one of ordinary skill will recognize that other example cloning procedures are possible as well. For example, FIG. 2A provides an example of A DPG being cloned on a single DVS. However, if the service console 202 is managing more than one DVS, then a DPG may be cloned from one DVS to a second, different DVS. In FIG. 2D, the virtual network is cloned from one physical host to a different physical host. However, it is also possible to clone the entire virtual network within the same physical host such that two copies of the virtual network would exist within the virtual environment 291 of Host A 230. The examples illustrated in FIG. 2A-2D were described with respect to a DVS 206. However, similar cloning operations may also occur within an environment similar to that of FIG. 1A and FIG. 1C in which standard virtual switches are present.

In the examples above, the source of the virtual resources to be cloned were actual virtual resources that are configured and hosted within an existing virtual environment. As an alternative, the source of the virtual resources may be templates that a service console can access. These templates can then be cloned into a virtual environment. For example, in FIG. 2E, a physical host Host A provides a virtual environment 272. A user can then use the service console 202 to access a template database 270 to choose a template of a virtual resource that the user would like cloned in the virtual environment 272. In this manner, a target virtual resource 274 can be created and configured within the virtual environment 272.

The template database can include a wide variety of virtual resources such as standard virtual switches, distributed virtual switches, distributed port groups of different sizes, distributed port groups with different port settings and policies, VLANs, and entire virtual distributed networks as well. When an entire virtual distributed network is cloned using a template, the template may include the configuration parameters for the virtual network resources (e.g., switches, VLANs, distributed port groups), configuration information for the virtual machines, the network arrangement and connectivity of the virtual machines, their operating systems and their executable applications can all be cloned such that a distributed service template can be selected and cloned in a simple manner.

The virtual resource templates will have configuration parameters such as, for example, settings and policies that depend on the type of virtual resource that is the subject of the template. For example, a VLAN template will have different configuration settings than a distributed port group. A distributed virtual switch will have different policies and settings as well. Each template can be fully configured such that each setting or policy applicable to the template is assigned a default value. Alternatively, some of the settings and policies can be left unassigned so that a user can customize the cloned resource (e.g., 274) once it is cloned from the template. Thus, a predetermined set of the configuration parameters for a virtual resource template can be assigned values; this set can include all the configuration parameters or just a subset. When cloning virtual resources from one or more templates in the template database 270, the user may also be provided the opportunity to name the target virtual resource with an identifier of their choice.

Within an example user interface of the service console 202, a user may be presented with a full or partial list of all the virtual resources that are available to be cloned. This list could, for example, be a hierarchically arranged diagram of a virtual networked environment such that selection of an item in the hierarchy automatically selects all the sub-elements in the hierarchy. The list could also include a list of available templates that can be cloned. The user interface could also present the available virtual resources and templates as icons that can be dragged-and-dropped around a graphical representation of the virtualized network environment. In this example user interface, the templates may have a visually distinct icon or some other flag that identifies them as templates. When such a template is cloned so that its copy now appears within the graphical representation of the virtualized network environment, the user can be presented with an option to change the template to an implemented virtual resource. The icon, or some other flag, for this virtual resource can then be changed to indicate it is now an implemented virtual resource and not a template. A similar process can occur in reverse, wherein a user can select an implemented virtual resource and use the service console to change its appearance, or some other flag, to indicate it should be saved as a template to the template database.

Figure 3:
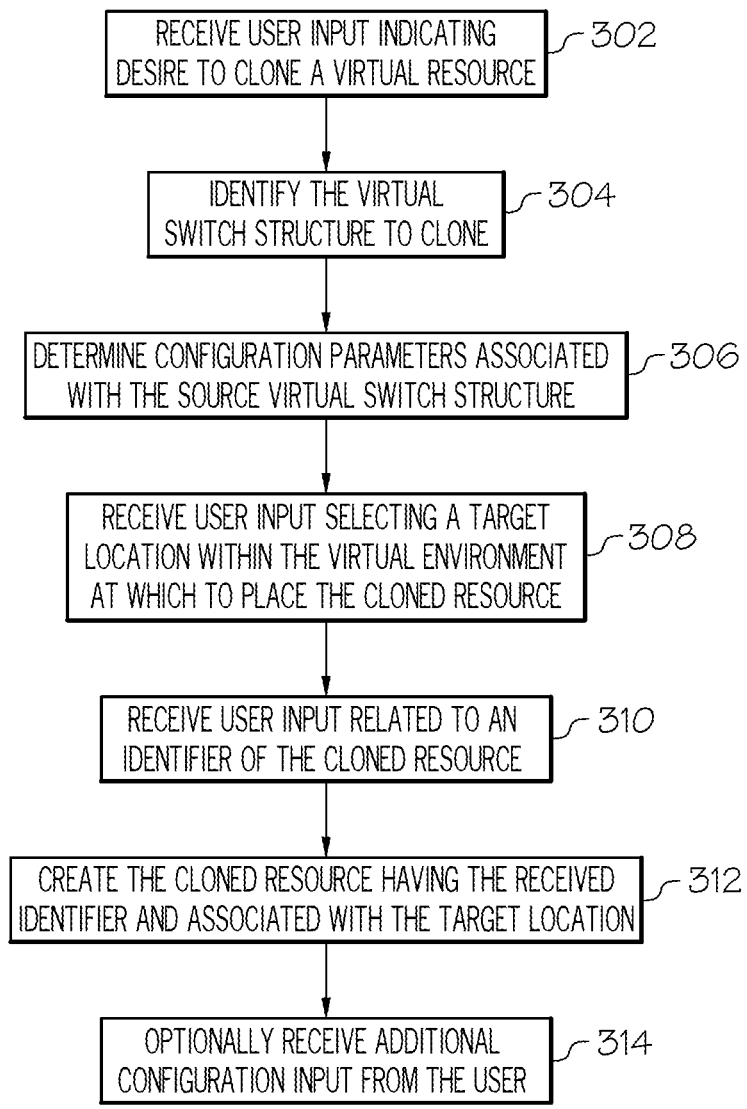
FIG. 3 depicts a flowchart of an example process for cloning virtual resources in accordance with the principles of the present disclosure.

FIG. 3 depicts a flowchart of an example process for cloning virtual resources in accordance with the principles of the present disclosure. The steps of the process may rely, in part, on user supplied input and can be accomplished by cooperation of different applications running on various physical hosts. However, FIG. 1B provides an example environment in which a service console (e.g., virtual management center 154) is used to clone virtual resources on one ESX Server 150 to another ESX Server 152. This example environment will be used, by way of example, to help clarify some of the steps of the process of FIG. 3.

In step 302, the service console receives user input that indicates the desire to clone virtual resources within a virtualized networking environment. The user can then use the service console to identify, in step 304, those virtual resources on one of the ESX Servers (the source) that are to be cloned to another of the ESX Servers (the target). More generally, the source virtual resource can include configuration parameters associated with a distributed virtual switch or a standard virtual switch and can generally be referred to as source virtual switch structure, as described above. Other virtual resources, such as for example virtual machines, associated with the source virtual switch structure can be replicated as well, if desired.

The service console, in step 306, can determine from the source ESX Server the configuration parameters associated with the identified source virtual switch structure and any associated virtual resources. Thus, the conglomeration of virtual resources can include a VLAN, a switch port, a DVS, a standard virtual switch, a distributed port group, uplink ports, and/or virtual machines, or even an entire virtual network. The user, in step 308, can also provide the service console with a target location within the virtualized network environment where the source virtual switch structure and associated virtual resources should be cloned. The identification of the target location depends on the type of virtual resource being cloned. For example, when cloning a distributed port group, the target location will include an identification of one or more ports on a distributed virtual switch. When cloning a distributed virtual switch, or a virtual network, the target location can be another ESX Server. The clone of the source virtual switch structure can be referred to as a target virtual switch structure and may be related to either a standard virtual switch or a distributed virtual switch, as described above.

Although the service console can arbitrarily select a random unique identifier for the target virtual switch structure (and associated virtual resources), the user can also provide such information, in step 310, so that the target virtual switch structure and its associated virtual resources can be uniquely identified within the virtualized network environment. The service console then communicates the configuration parameters to the target ESX Server so that, in step 312, the target virtual switch structure and its associated virtual resources are created within a virtual environment provided by the target ESX Server. The target virtual switch structure, when created, is automatically configured with the configuration parameters associated with the source virtual switch structure. The target associated virtual resources are arranged, coupled and configured with the target virtual switch structure the same as how the source associated virtual resources are arranged, coupled and configured with the source virtual switch structure The user can however, if desired in step 314, change some of the configuration parameters or add new configuration parameters.

The opportunity for the user to change some of the configuration parameters can be provided at different stages of the process described above. For example, the user can select the virtual resource(s) to clone and the service console can present the user with a list of the configuration parameters associated with the selected virtual resource(s). Before replicating occurs, the service console can inquire if the user wants to change any of the configuration parameters. If so, then the target virtual switch structure can be created with the user-modified configuration parameters. In other words, the source virtual switch structure may have a set of configuration parameters that define how that virtual resource is configured. Of these configuration parameters, a user can leave a first subset unchanged and modify a second subset of the configuration parameters. When the target virtual switch structure is created, it may not be an exact clone of the source virtual resource because it may be automatically configured according to both the first and second subsets of configuration parameters. Thus, while the target virtual switch structure may have many of the same configuration parameters as the source virtual switch structure, it can also have some user-modified configuration parameters as well. Virtual resources associated with the source virtual source structure can be modified in a similar manner.

Figure 2E:
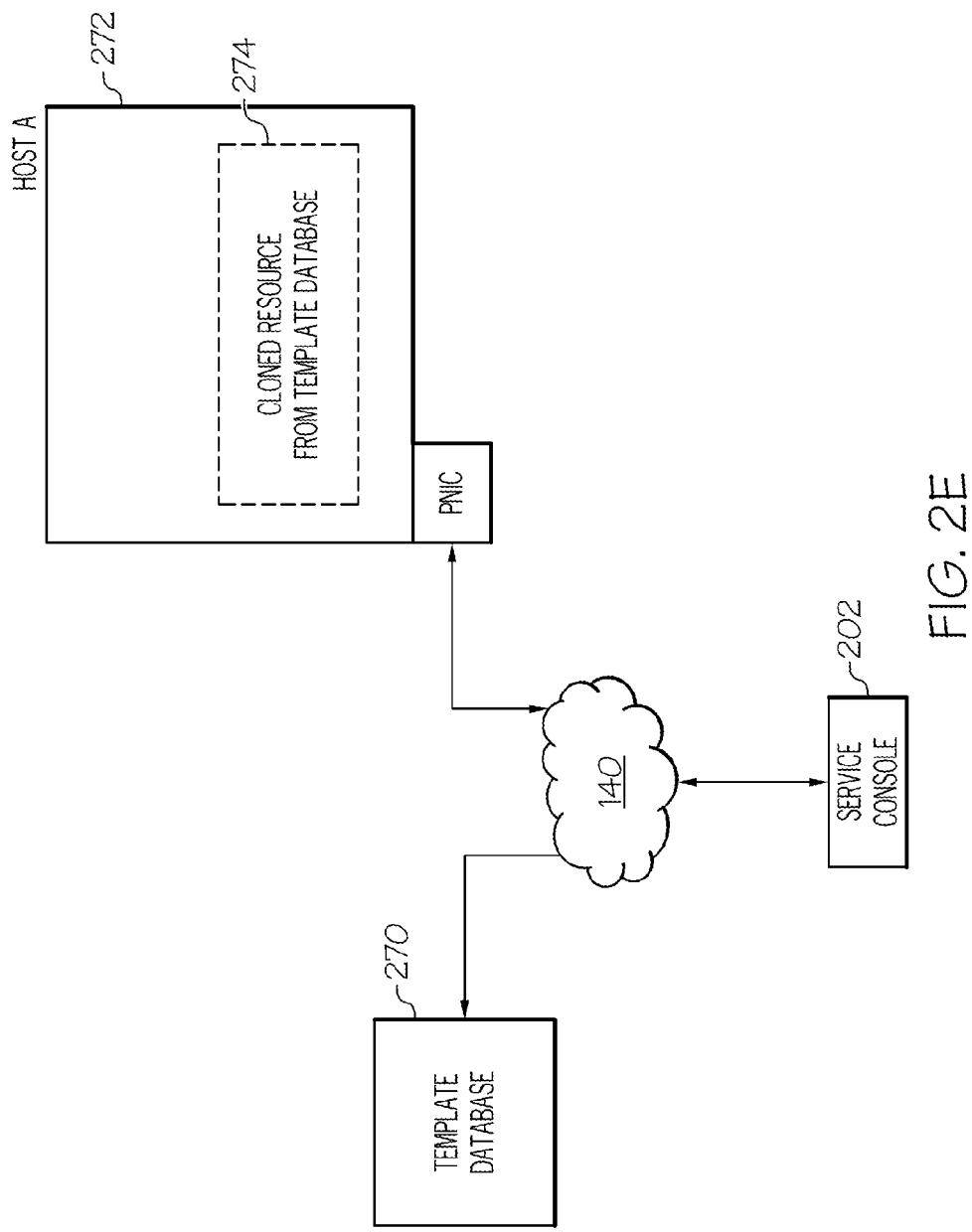
Figure 4:
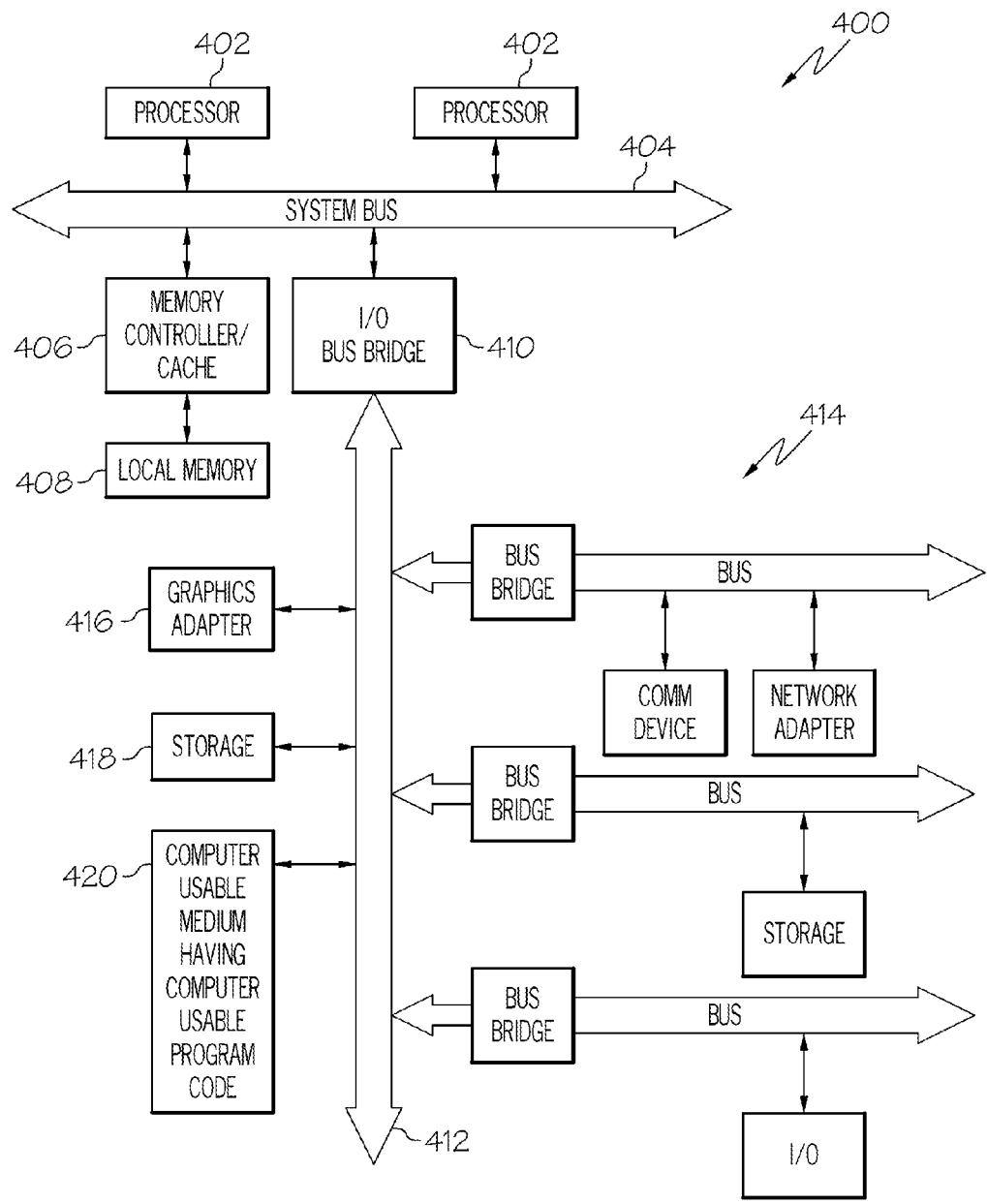
FIG. 4 illustrates a block diagram of a data processing system in accordance with the principles of the present disclosure.

As mentioned with respect to FIG. 2E, the source virtual switch structure may not necessarily be an already configured, hosted virtual resource. Instead, the source virtual switch structure may be selected from a template database that includes respective templates for a number of pre-configured virtual resources Referring to FIG. 4, a block diagram of a data processing system is depicted in accordance with the present disclosure. A data processing system 400, such as may be utilized to implement the hardware platform 108 or aspects thereof, e.g., as set out in greater detail in FIG. 1A-FIG. 3, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1A-FIG. 3.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of replicating a virtual resource, comprising:

identifying, by a computer, source virtual switch structure defining a virtual resource to be replicated, said source virtual switch structure comprising a set of configuration parameters,
  wherein the source virtual switch structure comprises a first distributed virtual switch and a first distributed port group associated with the first distributed virtual switch; and
creating, by the computer, target virtual switch structure; said creating comprising:
  replicating the source virtual switch structure and a first subset of the set of configuration parameters, and
  replicating a respective set of virtual machines associated with the first distributed port group, wherein said first distributed virtual switch, said first distributed port group and said virtual machines define a virtual distributed network.

2. The method of claim 1, wherein the source virtual resource switch structure comprises a configured virtual network resource operating in a virtual network and configured according to the set of configuration parameters.

3. The method of claim 1, wherein the source virtual switch structure comprises a template wherein the set of configuration parameters comprises a predetermined minimum number of configuration parameters related to the source virtual switch structure.

4. The method of claim 1, further comprising replicating a plurality of virtual machines coupled with the first distributed port group.

5. The method of claim 1, wherein the source switch structure further comprises a virtual local area network coupled with the first distributed port group.

6. The method of claim 1, wherein the target virtual switch structure comprises a second distributed port group of the first distributed virtual switch.

7. The method of claim 1, wherein the target virtual switch structure comprises a second distributed port group of a second distributed virtual switch.

8. The method of claim 1, wherein the source virtual switch structure is hosted on a first physical host and the target virtual switch structure is hosted on a second physical host different than the first physical host.

9. The method of claim 1, comprising:
creating a second subset of the set of configuration parameters by modifying those configuration parameters not members of the first subset and, wherein creating the target virtual switch structure further comprises:
  replicating the second subset of the set of configuration parameters.

10. A system for replicating a virtual resource, the system comprising:
a processor and a memory coupled to the processor, the memory configured to store program code executable by the processor;
the program code, when executed by the processor, identifies source virtual switch structure to be replicated comprising a set of configuration parameters,
  wherein the source virtual switch structure comprises a first distributed virtual switch and a first distributed port group associated with the first distributed virtual switch; and
the program code, when executed by the processor, creates target virtual switch structure, said creating comprising:
  replicating the source virtual switch structure and a first subset of the set of configuration parameters, and
  replicating a respective set of virtual machines associated with the first distributed port group, wherein said first distributed virtual switch, said first distributed port group and said virtual machines define a virtual distributed network.

11. The system of claim 10, wherein the source virtual switch structure comprises a configured virtual network resource operating in a virtual network and configured according to the set of configuration parameters.

12. The system of claim 10, wherein the source virtual switch structure comprises a template wherein the set of configuration parameters comprises a predetermined minimum number of configuration parameters related to the source virtual switch structure.

13. The system of claim 10, wherein the program code, when executed by the processor, replicates a plurality of virtual machines coupled with the first distributed port group.

14. The system of claim 10, wherein the source virtual switch structure comprises a virtual local area network coupled with the first distributed port group.

15. The system of claim 10, wherein the target virtual switch structure comprises a second distributed port group of the first distributed virtual switch.

16. The system of claim 10, wherein the target virtual switch structure comprises a second distributed port group of a second distributed virtual switch.

17. The system of claim 10, wherein the source virtual switch structure is hosted on a first physical host and the target virtual switch structure is hosted on a second physical host different than the first physical host.

18. The system of claim 10, wherein the program code, when executed, creates a second subset of the set of configuration parameters by modifying those configuration parameters not members of the first subset, and
replicates the second subset of the set of configuration parameters.

19. A computer program product for replicating a virtual resource, comprising:
a non-transitory computer readable storage medium having computer readable program code embodied therewith, the computer readable program code comprising:
  computer readable program code configured to identify source virtual switch structure to be replicated comprising a set of configuration parameters,
    wherein the source virtual switch structure comprises a first distributed virtual switch and a first distributed port group associated with the first distributed virtual switch; and
  computer readable program code configured t to create target virtual switch structure, said creating comprising:
    replicating the source virtual switch structure and a first subset of the set of configuration parameters, and
    replicating a respective set of virtual machines associated with the first distributed port group, wherein said first distributed virtual switch, said first distributed port group and said virtual machines define a virtual distributed network.

20. The computer program product of claim 19, wherein the source virtual switch structure comprises a configured virtual network resource operating in a virtual network and configured according to the set of configuration parameters.

21. The computer program product of claim 19, wherein the source virtual switch structure comprises a template wherein the set of configuration parameters comprises a predetermined minimum number of configuration parameters related to the source virtual switch structure.

22. The computer program product of claim 19, comprising:
   computer readable program code configured to replicate a plurality of virtual machines coupled with the first distributed port group.

23. The computer program product of claim 19, wherein the source virtual switch structure comprises a virtual local area network coupled with the first distributed port group.

24. The computer program product of claim 19, wherein the target virtual switch structure comprises a second distributed port group of the first distributed virtual switch.

25. The computer program product of claim 19, wherein the target virtual switch structure comprises a second distributed port group of a second distributed virtual switch.

26. The computer program product of claim 19, wherein the source virtual switch structure is hosted on a first physical host and the target virtual switch structure is hosted on a second physical host different than the first physical host.

27. The computer program product of claim 19, comprising:
   computer readable program code configured to create a second subset of the set of configuration parameters by modifying those configuration parameters not members of the first subset, and
   wherein the computer readable program code configured to create the target virtual switch structure is further configured to replicate the second subset of the set of configuration parameters.

28. The method of claim 1, wherein the first distributed virtual switch spans two different virtual environments.

29. The method of claim 1, wherein the first distributed virtual switch comprises a second distributed port group, the first distributed port group hosted on a first physical host and the second distributed port group hosted on a second physical host different than the first physical host.

30. The system of claim 10, wherein the first distributed virtual switch spans two different virtual environments.

31. The system of claim 10, wherein the first distributed virtual switch comprises a second distributed port group, the first distributed port group hosted on a first physical host and the second distributed port group hosted on a second physical host different than the first physical host.

32. The computer program product of claim 19, wherein the first distributed virtual switch spans two different virtual environments.

33. The computer program product of claim 19, wherein the first distributed virtual switch comprises a second distributed port group, the first distributed port group hosted on a first physical host and the second distributed port group hosted on a second physical host different than the first physical host.

* * * * *